May 26, 1964 R. JOHNSTON 3,134,260
PNEUMATIC MEASURING APPARATUS
Filed April 13, 1961

INVENTOR.
ROBERT JOHNSTON
BY
J.T.Wolcensmith 2nd
ATTORNEY

United States Patent Office 3,134,260
Patented May 26, 1964

3,134,260
PNEUMATIC MEASURING APPARATUS
Robert Johnston, Levittown, Pa., assignor to Moore Products Co., Philadelphia, Pa., a corporation of Pennsylvania
Filed Apr. 13, 1961, Ser. No. 102,796
4 Claims. (Cl. 73—396)

This invention relates to pneumatic measuring apparatus and more particularly to apparatus for establishing an output pressure which is related to or equal to an input peak pressure.

In the pneumatic measuring of quantities, it is frequently desired to determine a peak fluid pressure. Such peak pressure can be derived from a plurality of sources such as from pneumatic gaging of irregular or out-of-round parts where a maximum dimension or diameter is to be measured; a maximum pressure occurring in gas chromatography; a maximum pressure in optimizing process control; a maximum temperature or pressure or other variables expressed as a pressure in a process; or other information determined as a pressure which is desired to detect and hold.

It has heretofore been proposed to utilize a pneumatic circuit having a check valve therein for passing the peak pressure. Circuits of this character are, however, disadvantageous because with a check valve, at the instant the peak occurs and the pressure begins to decrease, the check valve has zero differential. Most check valves exhibit leakage because where there is little or no differential at the check valve, little or no force is exerted on the seating member to move it to closed position.

In a check valve, any leakage which occurs tends to carry the checked pressure down with the input pressure, so that no seating force has an opportunity to build up. This decrease is in a direction to decrease the seating force and so continues indefinitely under the usual operating conditions. Check valves are, accordingly, troublesome particularly with peaks which occur slowly. It is virtually impossible to make check valves with sufficient precision to handle slow acting process changes.

In accordance with the present invention, pressure measuring apparatus is provided which overcomes the objectionable characteristics of check valves in that any stray leakage which should happen to occur at the seat will cause an increase in the seating forces so as to be essentially self-correcting as well as exceedingly limited in its amount and effect.

The pressure measuring apparatus, in accordance with the present invention, does not require precision seating members, but can be readily constructed with normal manufacturing tolerances.

In accordance with the present invention, also, pressure measuring apparatus is provided which is simple in construction and free from operating difficulties.

In accordance with the present invention, also, pressure measuring apparatus is provided constructed and arranged so that undesired dimensional changes are avoided in the part of the structure exposed to the pressure whose peak is to be measured.

In accordance with the present invention, also, pressure measuring apparatus is provided constructed and arranged to limit the amount of movement of the peak pressure responsive portions by a mechanical stop which prevents motion beyond that necessary to seat the inlet port of a valve actuated by the peak pressure responsive portions.

In accordance with the present invention, also, peak pressure measuring apparatus is provided in which undue expansion of the trapped fluid is prevented.

In accordance with the present invention, also, peak pressure measuring apparatus is provided in which the input chamber in which the peak pressure is effective is kept small to reduce the load presented by the device to an input circuit and to improve the frequency response of the apparatus.

Other objects and advantageous features of the invention will be apparent from the description and claims.

The nature and characteristic features of the invention will be more readily understood from the following description, taken in connection with the accompanying drawings forming part thereof, in which.

Figure 1:
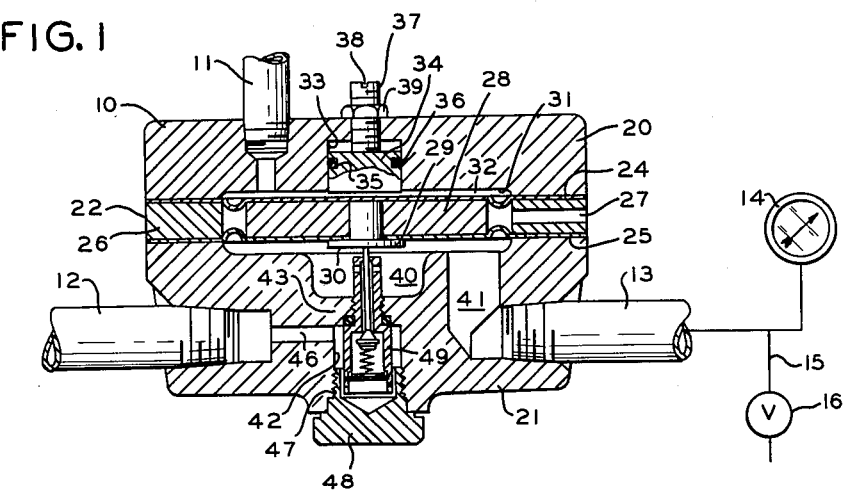
FIGURE 1 is a view partly in vertical section taken approximately on the line 1—1 of FIG. 2, and partly diagrammatic of pneumatic measuring apparatus, including a relay, in accordance with the present invention.
Figure 2:
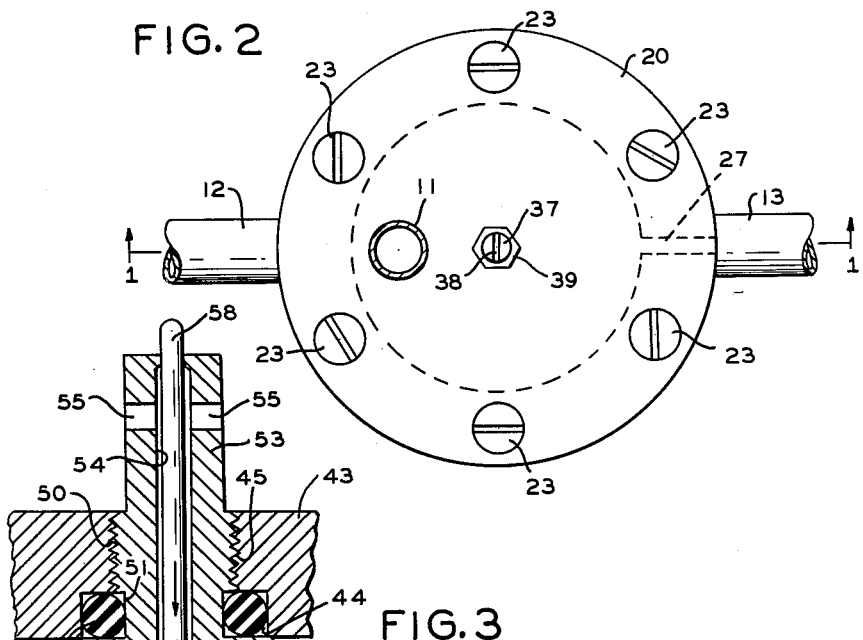
FIG. 2 is a top plan view of the relay shown in FIG. 1.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings in which a preferred embodiment of the invention is illustrated, a relay 10 is provided having a pipe 11 extending thereto which is connected to the system or apparatus whose peak fluid pressure is to be ascertained and utilized.

The relay 10 has a pipe 12 connected thereto, the pipe 12 being connected to any suitable source of filtered fluid, such as air, under pressure.

The relay 10 also has connected thereto a pipe 13 which is connected to a fluid pressure responsive device 14 for indicating, recording or controlling, and by way of illustration, is shown as a dial type pressure gage. The pipe 13 is dead-ended but is provided with a discharge connection 15 having a normally closed shutoff valve 16 therein.

The valve 16, as hereinafter explained, is employed for pressure relief after the determination of a peak, which pressure relief may be after a predetermined time interval, or in a particular sequence of operations, or otherwise as desired.

The relay 10 includes an upper housing section 20, and a lower housing section 21, with a diaphragm assembly 22 interposed therebetween. The housing sections 20 and 21 and the diaphragm assembly 22 are held in assembled relation in any desired manner such as by studs 23.

The diaphragm assembly 22 preferably includes spaced flexible diaphragms 24 and 25 held in spaced relation at their peripheries by a diaphragm spacer ring 26. The ring 26 is preferably provided with a passageway 27 from the inner to the outer margin thereof, serving as a vent to atmosphere of the space between the diaphragms 24 and 25. The diaphragms 24 and 25 can be made of any suitable material, such as rubber, natural or synthetic, which is impervious to fluids and is resistant to corrosion by the fluids to which it is exposed.

The diaphragms 24 and 25 have a central spacer 28 therebetween with an actuating plate 29 carried thereby. The plate 29 has a lower face 30 for valve actuation.

The housing section 20 has a dished portion 31, serving as a pressure chamber 32, bounded in part by the diaphragm 24, and the fluid connection 11 is in communication with the chamber 32.

The housing section 20 is provided with a bore 33 within which a motion limiting head 34 is mounted. The head 34 is provided with an annular recess 35 for the reception of a packing ring 36, of any desired type, such as an O-ring, mounted therein and in engagement with the bore 33 for preventing fluid leakage at this location. The head 34 has a threaded stud 37 which is in threaded engagement in and extends exteriorly of the housing section 20 for manual access for adjustment. The stud 37 can be provided with a slot 38 for this purpose, and has a lock nut 39 mounted thereon for retaining the stud 37 in its adjusted position.

The lower housing section 21 has a pressure chamber 40 therein, bounded in part by the diaphragm 25 and is preferably of such diameter that the diaphragms 24 and 25 have equal effective areas.

The chamber 40 has a fluid connection 41 with which the pipe 13 is in communication.

The housing section 21 has a bore 42 therein with a partition wall 43 separating it from the chamber 40. The partition wall 43 has an annular opening 44 therein and with a coaxially disposed threaded opening 45 extending therefrom. The bore 42 has a fluid connection with which the pipe 12 is in communication.

Figure 3:
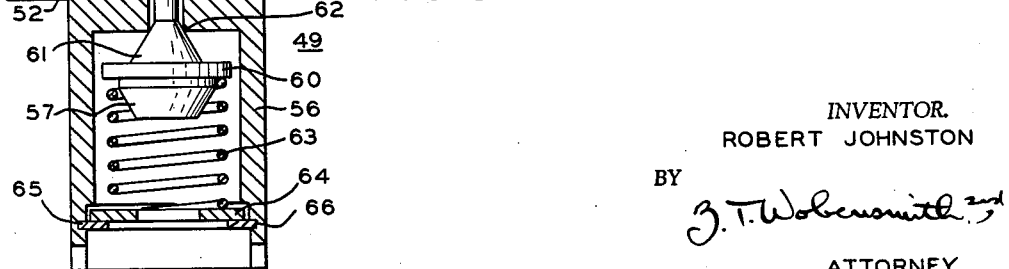
FIG. 3 is a vertical sectional view, enlarged, showing the details of construction of a valve employed in connection with the relay.

The outer end of the bore 42 has a threaded section 47 for the reception of a closure plug 48 for permitting access to a valve assembly 49 which is shown in detail in FIG. 3.

The valve assembly 49 as illustrated in FIG. 3, includes a valve body section having a threaded portion 50 for engagement in the threaded opening 45 and a recessed portion 51 for the reception of a packing member 52, of any preferred type, such as an O-ring, for preventing fluid leakage at this location. The valve body section has an extension 53 within the chamber 40 with a longitudinally extending passageway 54 and side connecting passageways 55. The valve body section has a sleeve portion 56 disposed in the bore 42. A valve seating member 57 is provided which includes a stem 58 extending through the longitudinal passageway 54 for engagement by the actuator plate 29 and has a head 60 with a conical portion 61 for seating on a valve seat 62 in the body section at the end of the passageway 54 for controlling the pressure application upwardly past the seat 62 and into the chamber 40.

The head 60 serves as a spring abutment for one end of a compression coil spring 63. The other end of the spring 63 engages an annular spring abutment 64 which is held in position by a split ring 65 engaged in a groove 66 in the sleeve portion 56.

The mode of operation will now be pointed out.

Assuming that pressure fluid from the source is supplied to the pipe 12, if no pressure is applied in the chamber 32, the valve portion 61 will be seated on the valve seat 62. If now pressure is applied through the pipe 11 and into the chamber 32 so as to be effective on the diaphragm 24 the valve seating member 57 will be operated by engagement of the actuating face 30 with the stem 58 to move the conical portion 61 from the seat 62 to permit pressure to be built up in the chamber 40 and in the pipe 13 connected thereto. If the effective areas of the diaphragms 24 and 25 are the same, the pressure in the chamber 40 will be the same as that of the prior peak pressure prevailing in the chamber 32.

From time to time, peaks of pressure will be applied through the pipe 11 and in the chamber 32. The highest acting peak will cause a pressure to be established in the chamber 40 and retained or sealed in that chamber for observation or use by the fluid pressure responsive device 14. The retention is effected by the valve portion 61 being held against the seat 62. The chamber 32 is made small so as to reduce the load presented to the input portion of the circuit which includes the pipe 11 and also to improve the frequency response.

The motion limiting head 34 is positioned and held in its adjusted position to prevent motion of the diaphragms 24 and 25 and the control plate 29 carried thereby beyond that necessary to permit the valve seating portion 61 to engage the valve seat 62. In this manner, the fluid sealed in the chamber 40 with the valve portion 61 engaged on its seat 62 is prevented from expanding.

The provision of the spaced diaphragms 24 and 25 and the venting of the space between the diaphragms 24 and 25 to atmosphere through the vent passageway 27 avoids dimensional changes in both the diaphragms 24 and 25, due to change of pressures acting thereon which would affect the pressure of the fluid trapped in the chamber 40.

At the end of the time interval at which the pressure peaks in the chamber 32 are measured or in a particular sequence of operations and when desired, the valve 16 is opened to vent the pipe 13 and the chamber 40 in preparation for subsequent peak pressures to be effective in the chamber 32, and for again providing in the chamber 40 a measured pressure related to the peak pressure.

I claim:

1. Pneumatic measuring apparatus comprising a connection to a process variable whose peak pressure is to be measured, a connection to a source of fluid under pressure, a normally closed fluid outlet connection, a fluid pressure responsive member connected to said outlet connection, a relay comprising a first housing section, a second housing section, and diaphragm assembly interposed between said sections and having opposite face portions, each of said housing sections having a chamber therein bounded by one of said face portions, one of said chambers having said process variable connection in communication therewith, and the other of said chambers having said outlet connection in communication therewith, the other of said chambers having a fluid connection with which said connection to said source is connected, a valve member interposed between said connection to said source and said other chamber and controlled by the positioning of said diaphragm assembly, said valve member being movable to closed position, and an adjustable motion limiting member for limiting the motion of said diaphragm assembly beyond a position to close said valve member thereby to limit the expansion of pressure fluid delivered by said valve to said outlet connection.

2. Pneumatic measuring apparatus comprising a connection to a process variable whose peak pressure is to be measured, a fluid connection to a source of fluid under pressure, and a normally closed outlet fluid connection, a fluid pressure responsive means in communication with said outlet connection, a relay comprising a first housing section, a second housing section, a diaphragm assembly interposed between said sections, said diaphragm assembly having a plurality of diaphragms in spaced relation with a vent therebetween and connected for movement together, one of said housing sections having a chamber therein bounded by one of said diaphragms with which said process variable connection is in communication, another of said housing sections having a chamber bounded by another of said diaphragms to which said outlet fluid connection is connected, said other housing section having said connection to said source connected thereto, a valve member interposed between said other housing connection and said connection to said source and controlled by the positioning of said diaphragm assembly, said valve member being movable to a closed position, and an adjustable motion limiting member for limiting the motion of said diaphragm assembly beyond a position to close said valve member thereby to limit the expansion of pressure fluid delivered by said valve.

3. Pneumatic measuring apparatus comprising a fluid pressure responsive member, a fluid pressure connection to a process variable whose peak pressure is to be measured in communication with said member, a connection to a source of pressure fluid, a valve member controlled by said fluid pressure responsive member to which said last connection is connected and movable to closed position, a normally closed fluid outlet connection in communication with said fluid pressure responsive member and connected to said valve member for the supply of pressure fluid thereto, and an adjustable stop member for limiting the movement of said pressure responsive member beyond a position to close said valve member and limiting the expansion of fluid in said outlet connection.

4. Pneumatic measuring apparatus comprising a fluid pressure responsive member, a fluid pressure connection to a process variable whose peak pressure is to be measured in communication with said member, a connection to a source of pressure fluid, a valve member controlled by said fluid pressure responsive member to which said last connection is connected, and a normally closed fluid outlet connection in communication with said fluid pressure responsive member and connected to said valve member for the supply of pressure fluid thereto, said fluid pressure responsive member comprising a pair of spaced diaphragms connected for movement together and having the space therebetween vented to atmosphere.

References Cited in the file of this patent

UNITED STATES PATENTS

| | | |
|---|---|---|
| 1,992,343 | Ahnstrom | Feb. 26, 1935 |

FOREIGN PATENTS

| | | |
|---|---|---|
| 1,095,407 | France | Dec. 22, 1954 |